(12) United States Patent
Cumings et al.

(10) Patent No.: US 7,880,322 B2
(45) Date of Patent: Feb. 1, 2011

(54) FLUID TURBINE DEVICES AND METHODS RELATED TO FLUID TURBINE DEVICES

(75) Inventors: Robert C. Cumings, St. Peters, MO (US); Ronald J. Birly, Florissant, MO (US)

(73) Assignee: Freiezo LLC, St. Peters, MO (US)

( * ) Notice: Subject to any disclaimer, the term of this patent is extended or adjusted under 35 U.S.C. 154(b) by 3 days.

(21) Appl. No.: 12/568,091

(22) Filed: Sep. 28, 2009

(65) Prior Publication Data

US 2010/0260593 A1   Oct. 14, 2010

(51) Int. Cl.
*F03D 3/00* (2006.01)
(52) U.S. Cl. .............................. 290/54; 290/55; 415/4.1; 415/4.4
(58) Field of Classification Search .................. 290/55; 415/2.1
See application file for complete search history.

(56) References Cited

U.S. PATENT DOCUMENTS

| | | | |
|---|---|---|---|
| 1,615,675 | A | 1/1927 | Bender |
| 4,031,405 | A | 6/1977 | Asperger |
| 4,075,500 | A | 2/1978 | Oman et al. |
| 4,119,863 | A * | 10/1978 | Kelly ........................... 290/55 |
| 4,237,384 | A | 12/1980 | Kennon |
| 4,288,200 | A | 9/1981 | O'Hare |
| 4,295,783 | A | 10/1981 | Lebost |
| 4,309,146 | A * | 1/1982 | Hein et al. .................... 415/4.4 |
| 4,474,529 | A * | 10/1984 | Kinsey ......................... 415/4.2 |
| 4,551,631 | A * | 11/1985 | Trigilio ........................ 290/55 |
| 4,652,206 | A | 3/1987 | Yeoman |
| 5,083,899 | A | 1/1992 | Koch |
| 5,447,412 | A | 9/1995 | Lamont |
| 5,463,257 | A * | 10/1995 | Yea ............................. 290/55 |
| 5,503,530 | A * | 4/1996 | Walters ................... 416/197 A |
| 5,852,331 | A | 12/1998 | Giorgini |
| 6,638,005 | B2 * | 10/2003 | Holter et al. .................. 415/4.2 |

(Continued)

FOREIGN PATENT DOCUMENTS

DE        3631709        3/1988

OTHER PUBLICATIONS

Falcon Series; Vertical Axis Wind Turbines (VAWT); www.wepower.us; copyright 2009; 7 pgs.

(Continued)

*Primary Examiner*—Joseph Waks
(74) *Attorney, Agent, or Firm*—Harness, Dickey & Pierce, P.L.C.

(57) ABSTRACT

Fluid turbine devices and methods related to fluid turbine devices are disclosed herein. One example method includes deflecting a first portion of a fluid flow from a return path of at least a portion of a vertical blade assembly, while permitting a second portion of the fluid flow to enter a drive path of the vertical blade assembly. One example fluid turbine device includes a vertical blade assembly having multiple blades and a shroud rotatable relative to the vertical blade assembly. The shroud includes a leading edge portion for deflecting a first portion of a fluid flow from entering a return path of at least a portion of the vertical blade assembly and a portion defining multiple openings configured to permit fluid from within a compartment defined by the vertical blade assembly to exhaust out of the return path.

17 Claims, 15 Drawing Sheets

U.S. PATENT DOCUMENTS

| | | | |
|---|---|---|---|
| 6,655,907 B2 | 12/2003 | Brock et al. | |
| 6,955,521 B2 | 10/2005 | Yang | |
| 6,966,747 B2 | 11/2005 | Taylor et al. | |
| 6,984,899 B1 | 1/2006 | Rice | |
| 7,109,599 B2 | 9/2006 | Watkins | |
| 7,215,037 B2 * | 5/2007 | Scalzi | 290/55 |
| 7,230,348 B2 * | 6/2007 | Poole | 290/55 |
| 7,235,893 B2 | 6/2007 | Platt | |
| 7,365,448 B2 | 4/2008 | Stephens | |
| 7,381,030 B1 | 6/2008 | Vanderhye | |
| 7,540,705 B2 | 6/2009 | Emshey | |
| 7,726,933 B2 * | 6/2010 | Johnson | 415/4.2 |
| 2008/0023964 A1 | 1/2008 | Sureshan | |
| 2008/0085179 A1 | 4/2008 | Kinkaid et al. | |
| 2009/0045632 A1 * | 2/2009 | Krauss | 290/54 |
| 2010/0213716 A1 * | 8/2010 | Santoro | 290/54 |

OTHER PUBLICATIONS

Office Action from U.S. Appl. No. 12/856;695, which is related to the instant application through a priority claim; dated Dec. 8, 2010, 9 pages.

Office Action from U.S. Appl. No. 12/856,693, which is related to the instant application through a priority claim; dated Dec. 8, 2010, 11 pages.

* cited by examiner

FLUID TURBINE DEVICES AND METHODS RELATED TO FLUID TURBINE DEVICES

FIELD

The present disclosure relates to fluid turbine devices and methods related to fluid turbine devices.

BACKGROUND

This section provides background information related to the present disclosure which is not necessarily prior art.

Fluid turbines are commonly used to convert fluid movement into useful work. Often, fluid turbines are employed such that fluid flow contacts multiple blades thereby causing rotation of the blades. The rotation of the multiple blades may be converted into any useful motion, such as rotating an input of a generator to generate electricity.

SUMMARY

This section provides a general summary of the disclosure, and is not a comprehensive disclosure of its full scope or all of its features.

According to one aspect of the present disclosure, a fluid turbine device includes a vertical blade assembly having multiple blades and a shroud rotatable relative to the vertical blade assembly. The shroud includes a leading edge portion for deflecting a first portion of a fluid flow from entering a return path of at least a portion of the vertical blade assembly. The shroud also includes a portion defining multiple openings configured to permit fluid from within a compartment defined by the vertical blade assembly to exhaust out of the return path.

According to another aspect of the present disclosure, a fluid turbine device includes a vertical blade assembly having first and second end plates and multiple blades disposed about a central axis between the two end plates. A shroud is provided that has a leading edge portion. The vertical blade assembly is disposed at least partially within the shroud and rotatable relative to the shroud. The shroud's leading edge portion is configured to deflect fluid flow around an external surface of the shroud on a first side external to the vertical blade assembly, while permitting fluid to enter a drive path of at least one of the multiple blades on a second side of the vertical blade assembly.

According to yet another aspect of the present disclosure, there is disclosed a shroud for a fluid turbine device having multiple blades rotatable in response to a fluid flow. The shroud includes an apertured surface and a leading edge portion. The leading edge portion has a first surface for deflecting fluid from a return path of the multiple blades and a second surface angled relative to the first surface for deflecting fluid flow into a drive path of the multiple blades.

According to another aspect of the present disclosure, a method relating to the operation of a fluid turbine device includes deflecting a first portion of a fluid flow from a return path of a vertical blade assembly, while permitting a second portion of the fluid flow to enter a drive path of the vertical blade assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
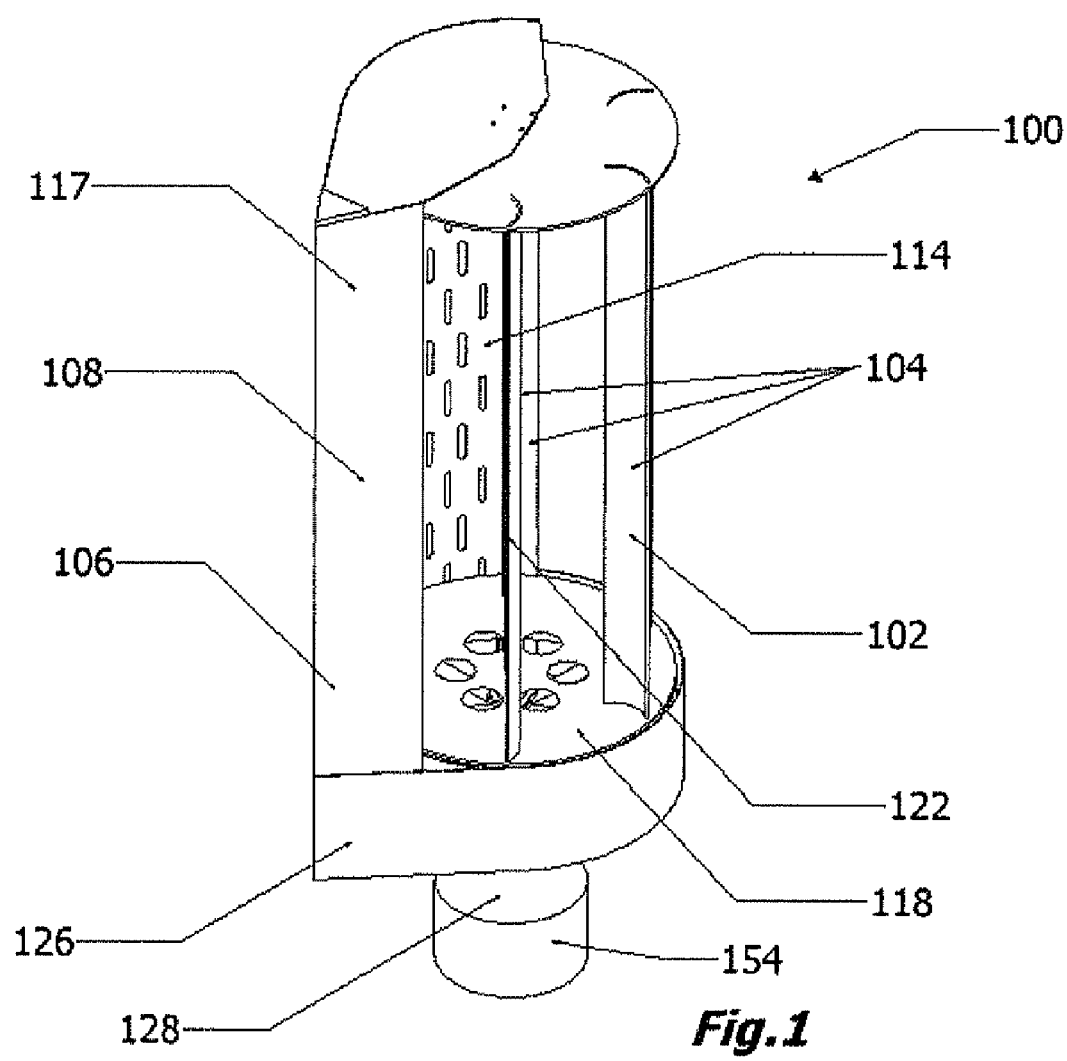
FIG. 1 is a perspective view of a fluid turbine device according to one example embodiment of the present disclosure.

FIGS. 4A-D are exploded views of the fluid turbine device of FIG. 1.

Figure 5:
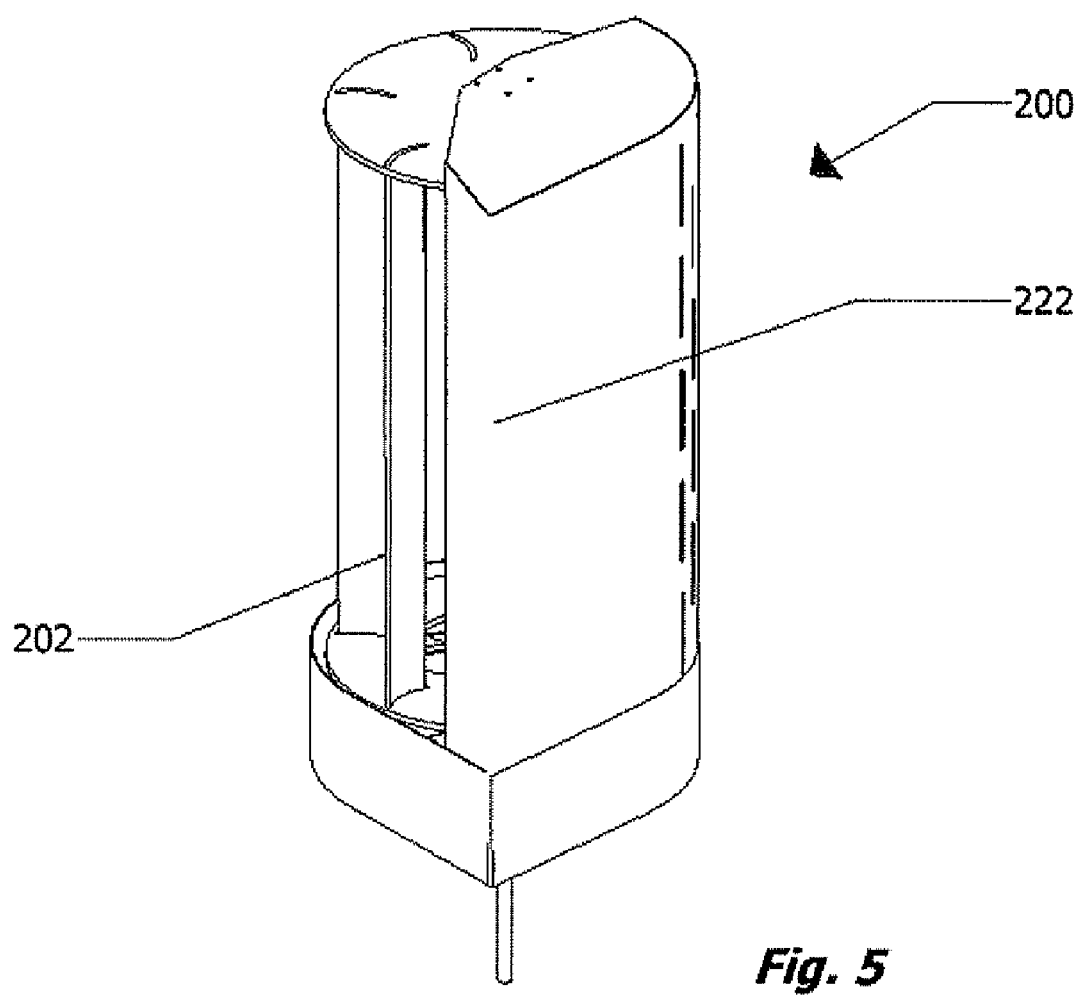

FIG. 5 is a perspective view of a fluid turbine device having a vertical blade assembly configured to rotate clockwise according to another example embodiment of the present disclosure.

Figure 6:
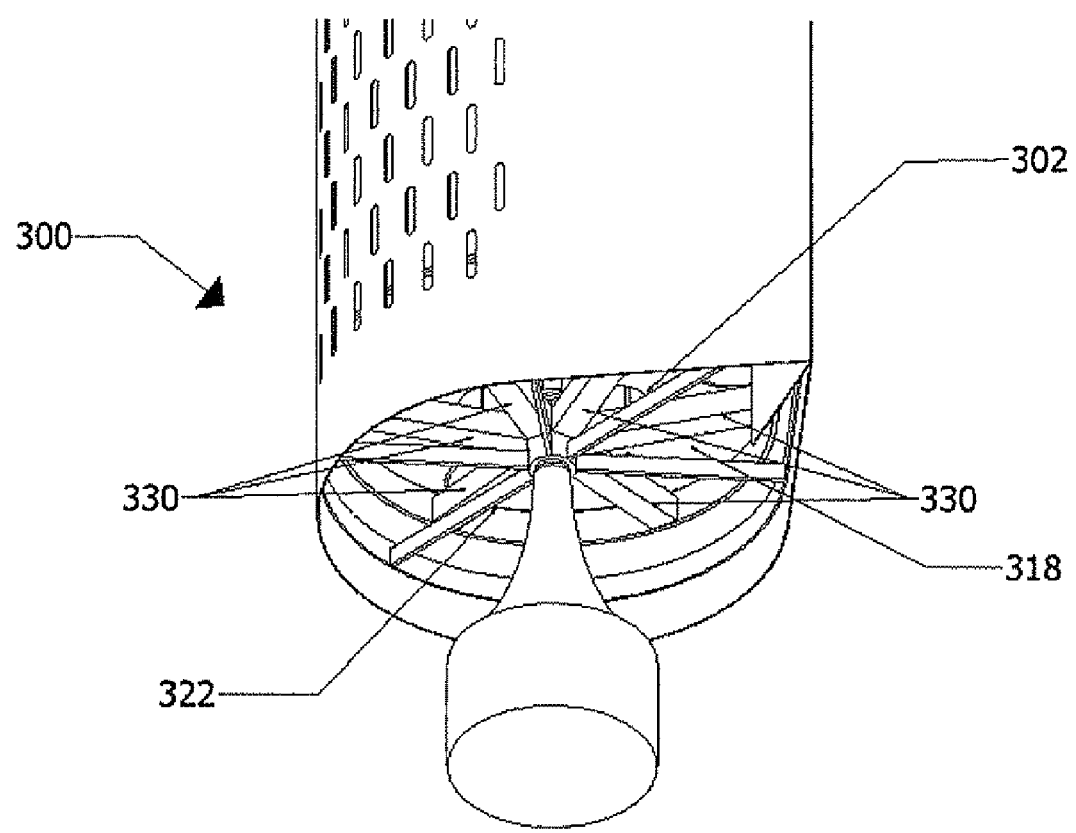

FIG. 6 is a sectional view of a fluid turbine device including a vertical blade assembly having multiple chambers according to yet another example embodiment of the present disclosure.

Figure 7:
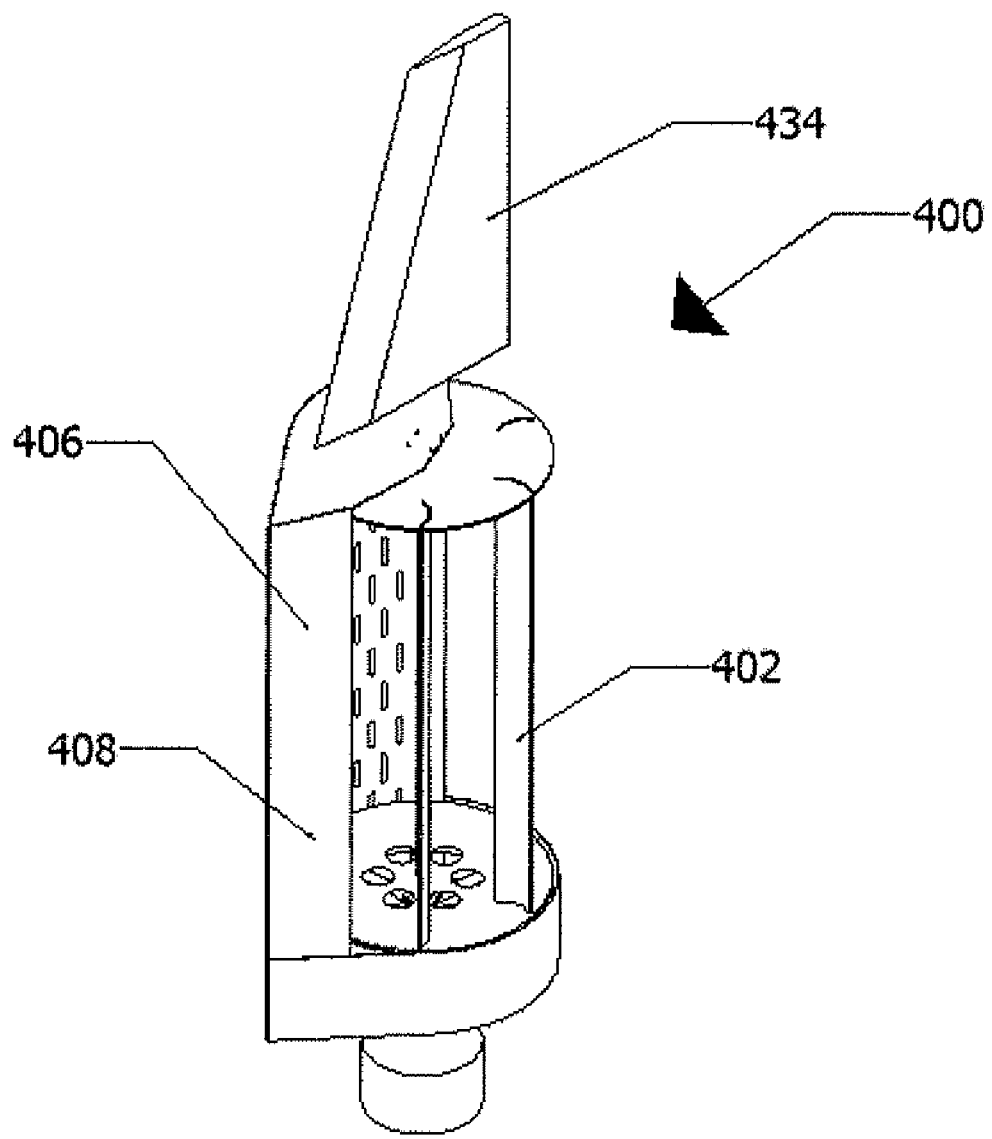

FIG. 7 is a perspective view of a fluid turbine device including a rudder according to another example embodiment of the present disclosure.

Figure 8A:
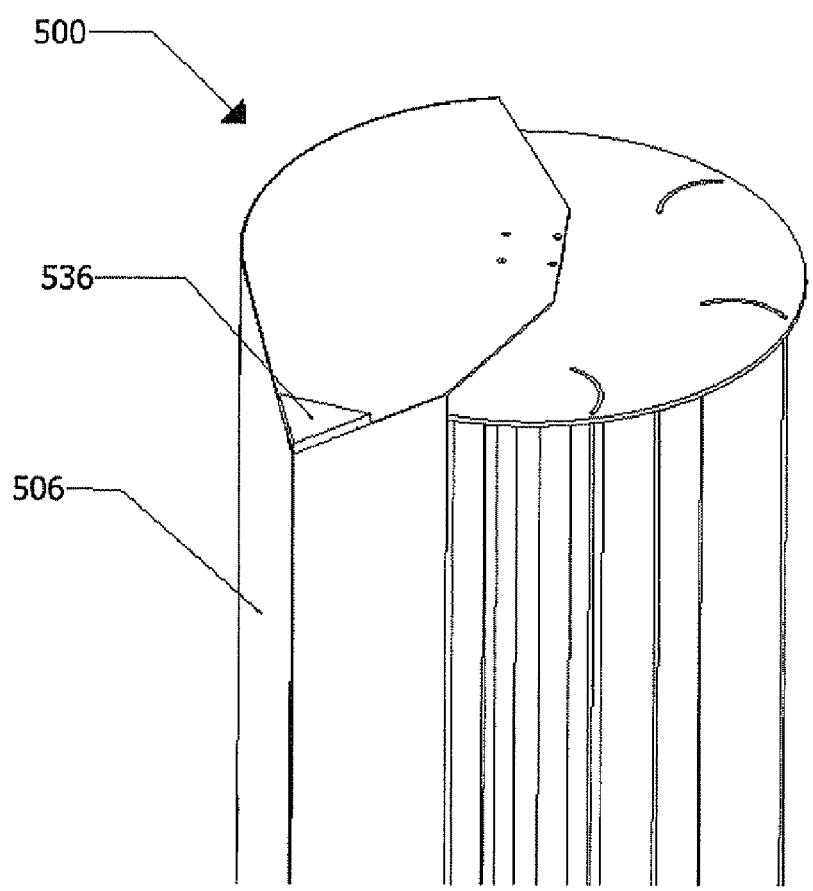
Figure 8B:
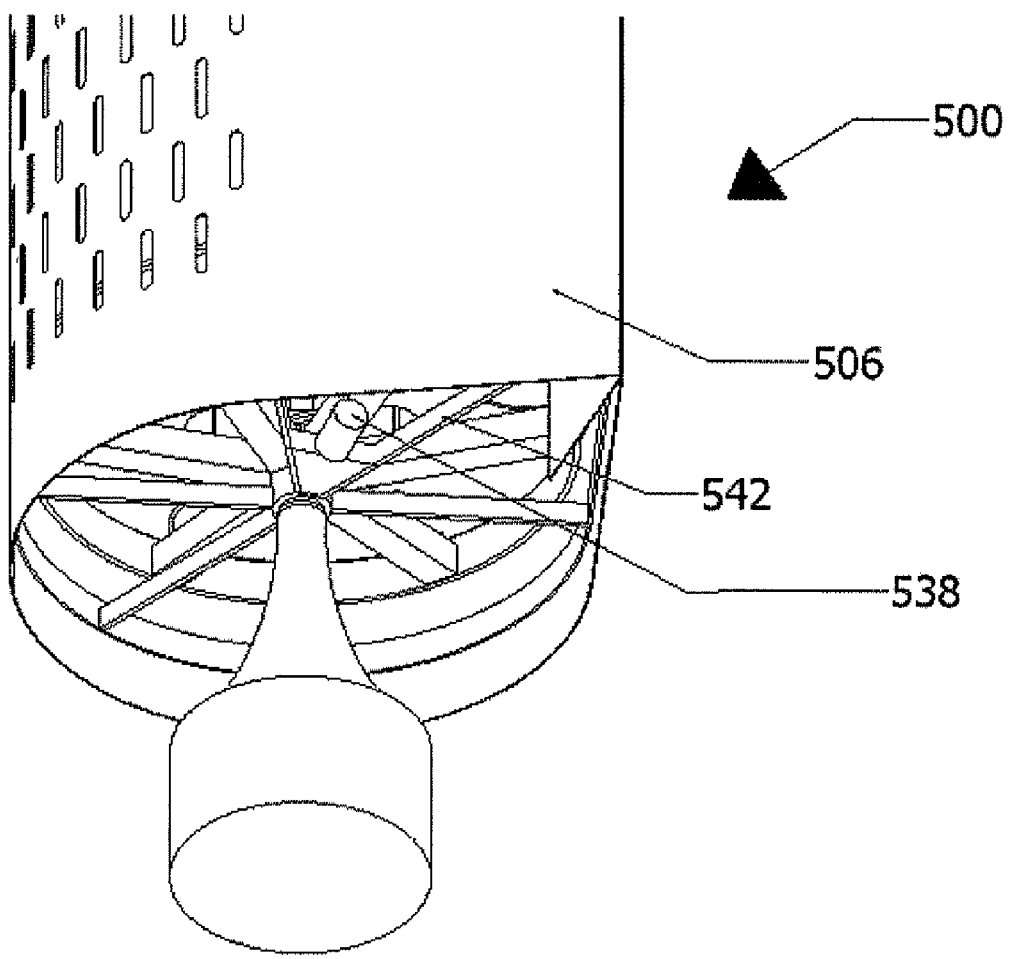

FIGS. 8A-B are partial perspective views of a fluid turbine device including a steering mechanism according to another example embodiment of the present disclosure.

Figure 9:
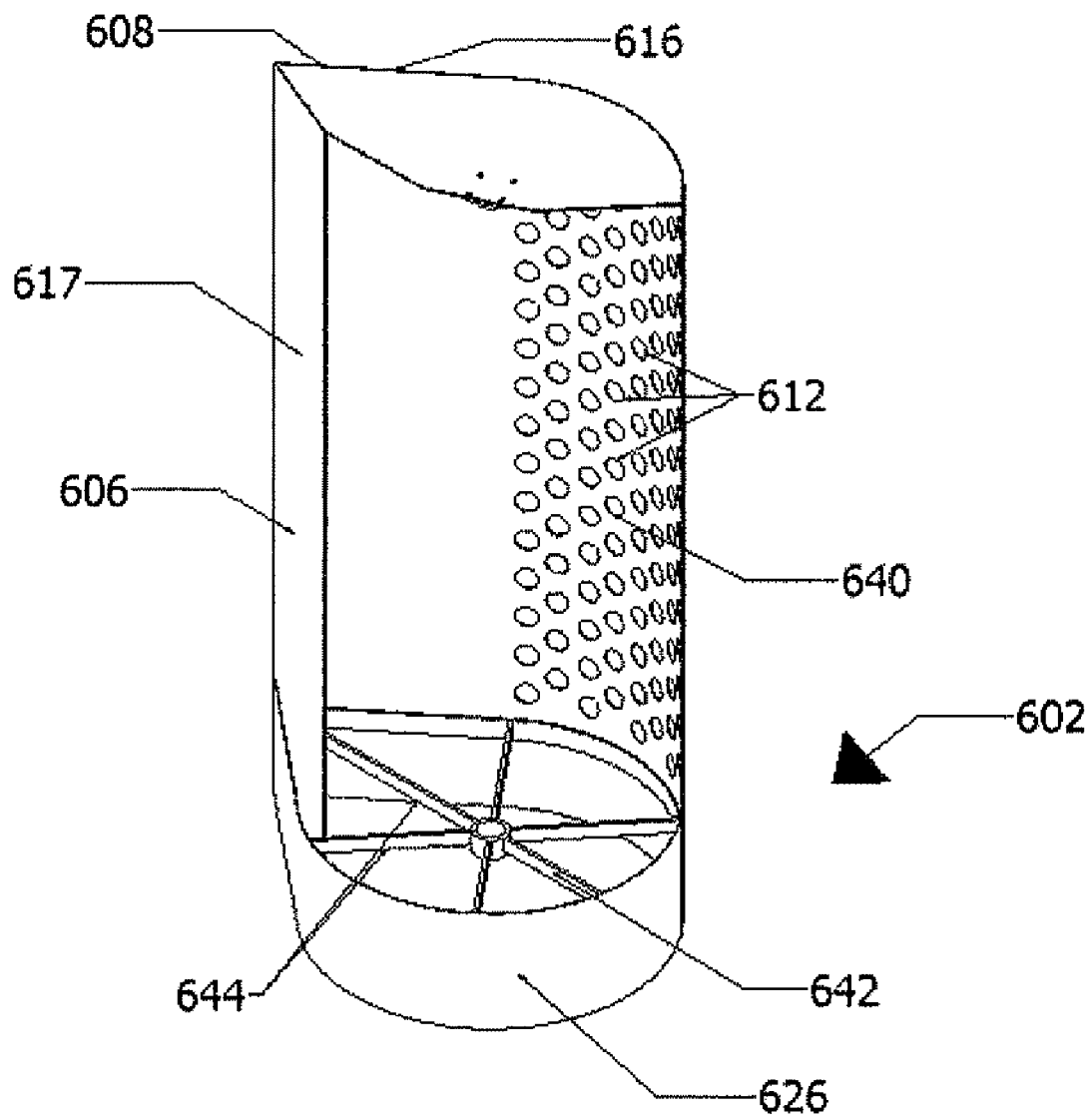

FIG. 9 is a perspective view of a shroud according to one example embodiment of the present disclosure.

Figure 10:
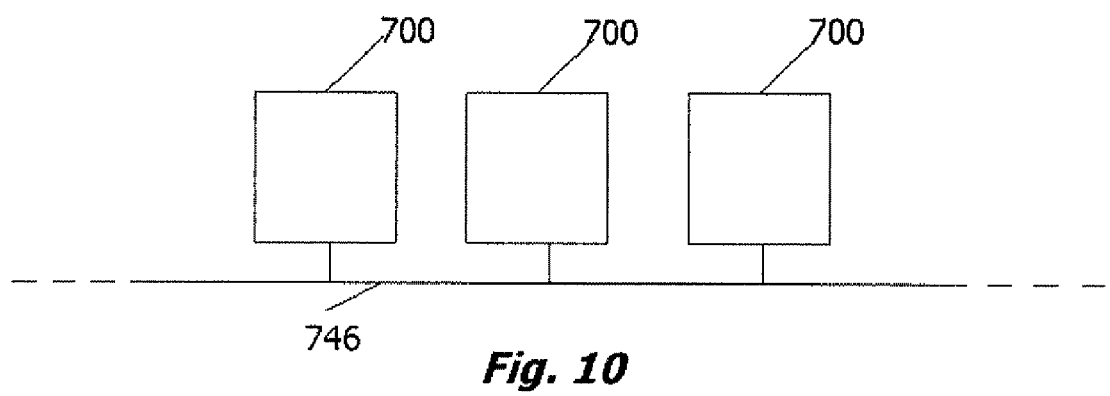

FIG. 10 is a block diagram of an electrical system including a grid according to another example embodiment of the present disclosure.

Figure 11:
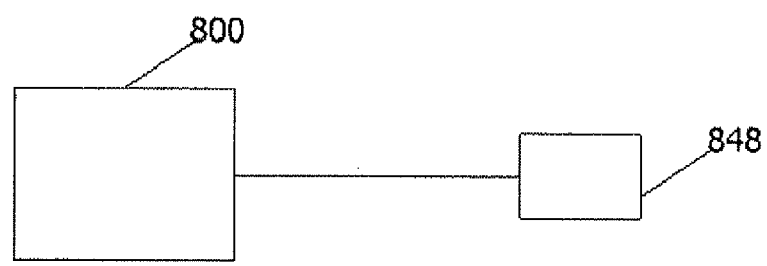

FIG. 11 is a block diagram of an electrical system including a battery according to yet another example embodiment of the present disclosure.

Figure 12:
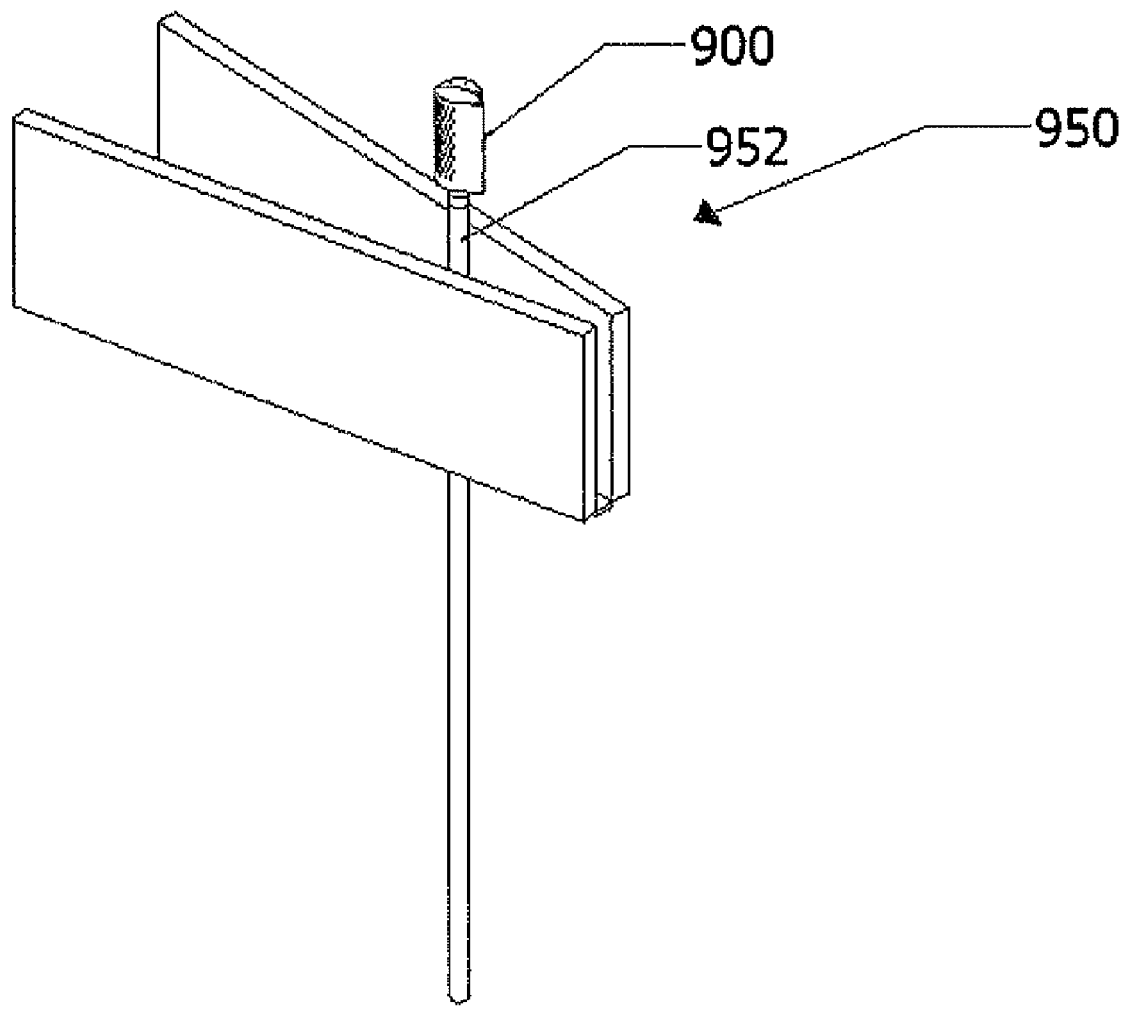

FIG. 12 is a perspective view of a billboard assembly according to one example embodiment of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific systems, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, surfaces, portions and/or sections, these elements, components, regions, surfaces, portions and/or sections should not be limited by these terms. These terms may be only used to distinguish one element, component, region, surface, portion or section from another region, surface, portion or section. Terms such as "first," "second," and other numerical terms when used herein do not imply a sequence or order unless clearly indicated by the context. Thus, a first element, component, region, surface, portion or section discussed below could be termed a second element, component, region, surface, portion or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, a method relating to the operation of a fluid turbine device includes deflecting a portion of a fluid flow from a return path of a vertical blade assembly, while permitting a portion of the fluid flow to enter a drive path of the vertical blade assembly.

The method may include generating a pressure differential for exhausting fluid from the return path and through a shroud assembly coupled to the vertical blade assembly. Additionally, or alternatively, the method may include forming a fluid vortex within the fluid turbine device and exhausting the fluid vortex through an end plate of the vertical blade assembly. In some embodiments, permitting a portion of the fluid flow to enter a drive path of the vertical blade assembly may include deflecting fluid flow into the drive path of the vertical blade assembly. According to various embodiments, a method may include selectively activating a plurality of generators based on a rotational speed of the vertical blade assembly. Additionally, or alternatively, the method may include redistributing mass from an interior position relative to the vertical blade assembly toward a perimeter position of the vertical blade assembly to limit the affect of fluid flow fluctuations.

In some applications practicing one or more of the methods disclosed herein, a fluid turbine device may provide efficient fluid flow path through and/or about the fluid turbine device, thereby reducing fluid flow turbulence of a vertical blade assembly and providing an efficient fluid turbine device. Additionally or alternatively, in some applications, a fluid turbine device according to the present disclosure may provide reduced loads on the fluid turbine device, and as a result less load on a structure supporting the fluid turbine device. In this manner, fluid turbine devices according to the present disclosure may be coupled to structures understood by those skilled in the art to be insufficient to harness fluid flow potential.

Figure 2:
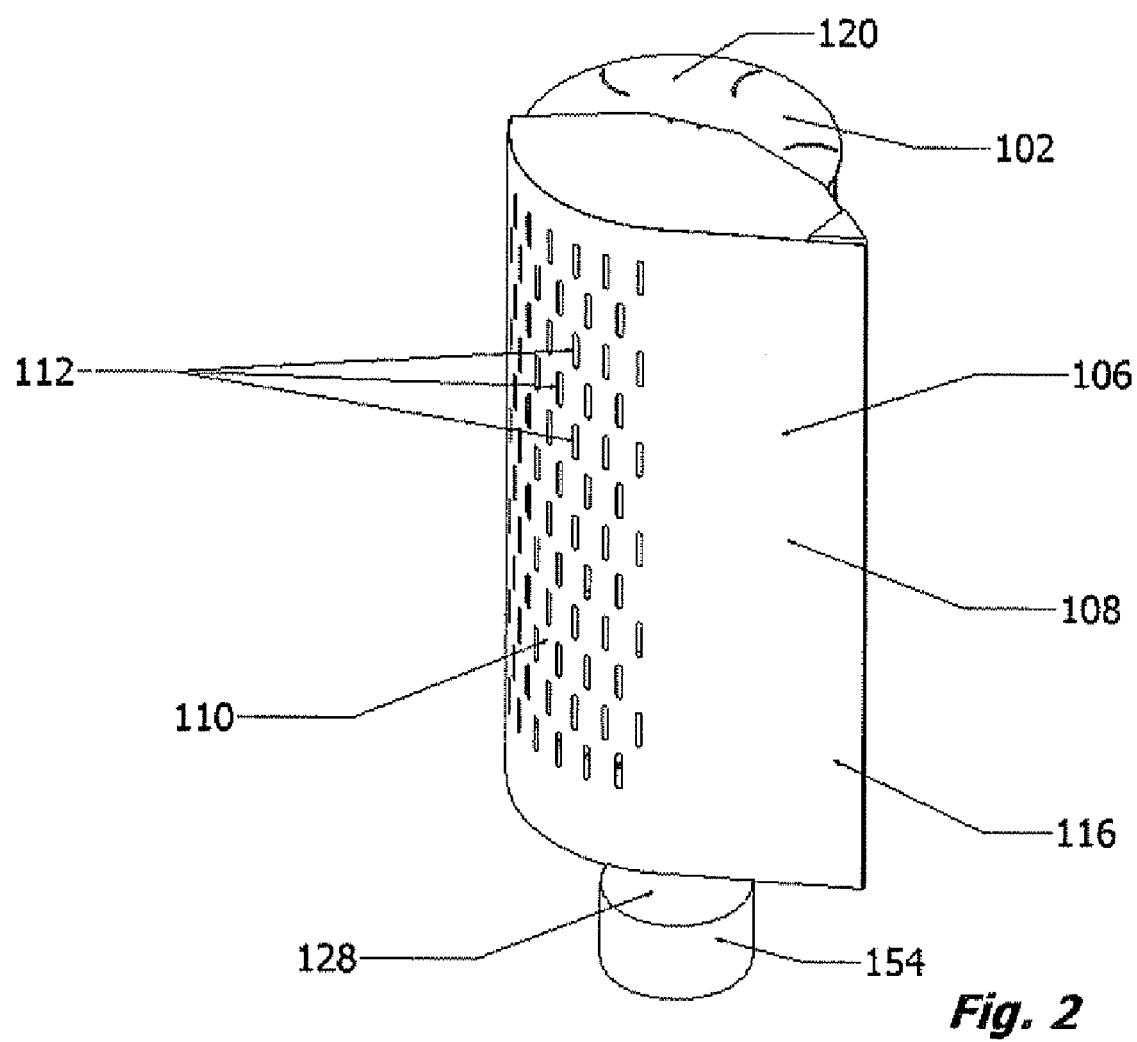
FIG. 2 is a perspective view of the fluid turbine device of FIG. 1.

One exemplary embodiment of a fluid turbine device 100 suitable for practicing one or more of the methods disclosed herein is illustrated in FIGS. 1 and 2. It should be understood, however, that the teachings of the present disclosure are not limited to the example fluid turbine devices and systems described below, and that other embodiments of fluid turbine devices and systems may employ one or more aspects of the methods of the present disclosure.

The fluid turbine device 100 includes a vertical blade assembly 102 having multiple blades 104 and a shroud 106. The shroud 106 is rotatable relative to the vertical blade assembly 102. The shroud 106 includes a leading edge portion 108 for deflecting a portion of a fluid flow from entering a return path of the vertical blade assembly 102. The shroud 106 also includes a portion 110 defining multiple openings 112. When fluid flows relative to the fluid turbine device 100, a pressure differential is generated between a compartment 114 and an area adjacent the multiple openings 112. The pressure differential (and Bernoulli's principle) provides conditions for fluid flow from the compartment 114. In some embodiments, the shroud 106 defines at least a portion of an airfoil shape. Accordingly, the multiple openings 112 permit fluid flow from within the compartment 114 defined by the vertical blade assembly 102 to exhaust out of the return path. It should be appreciated that a different number and/or configuration of openings may be defined in one or more portions of a shroud to adjust fluid flow through the shroud, thereby adjusting fluid flow relative to a fluid turbine device to, for example, alter fluid flow turbulence relative to the fluid turbine device.

Figure 3:
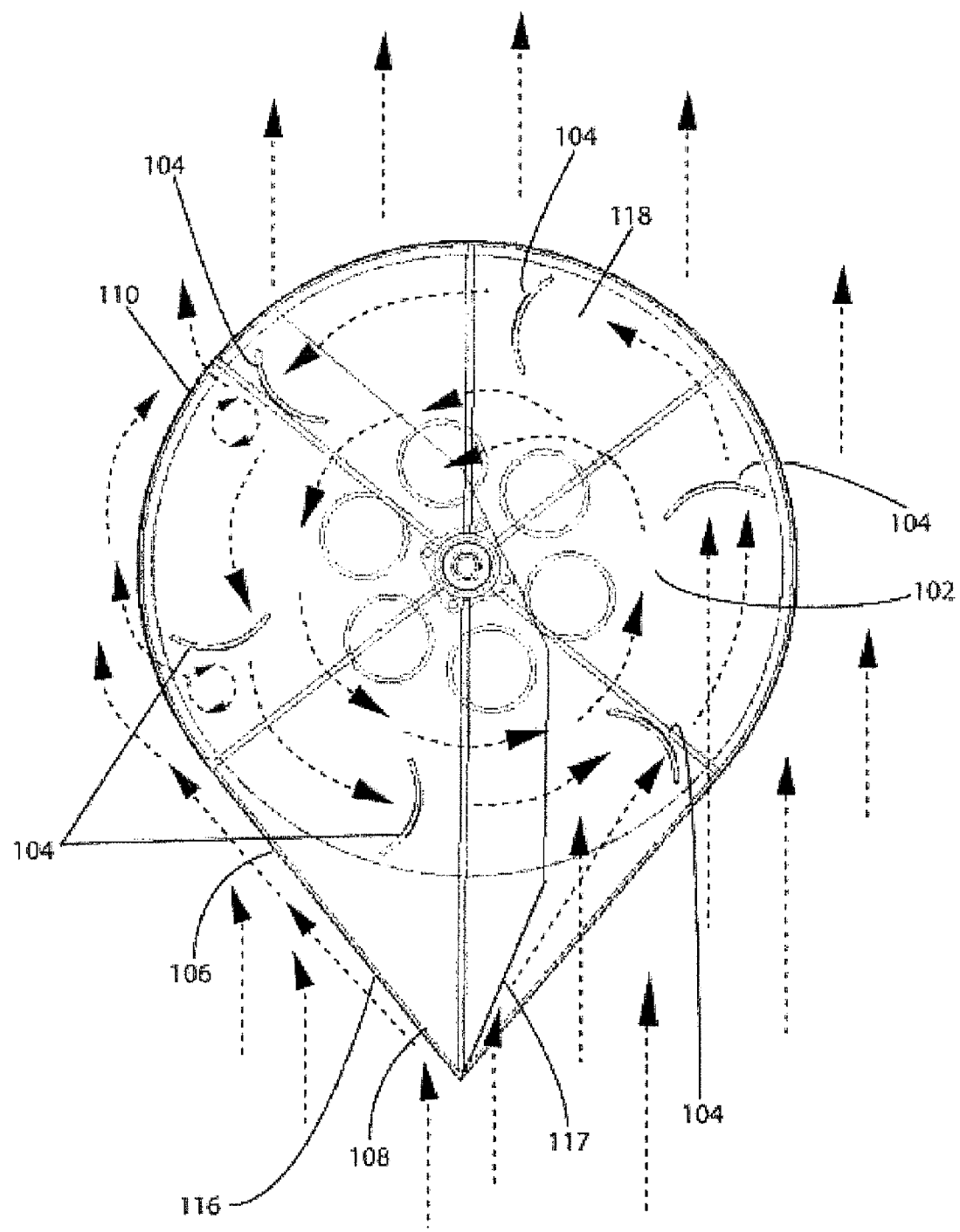
FIG. 3 is a plan view of the fluid turbine device of FIG. 1 showing fluid flow represented by arrows.
Figure 4A:
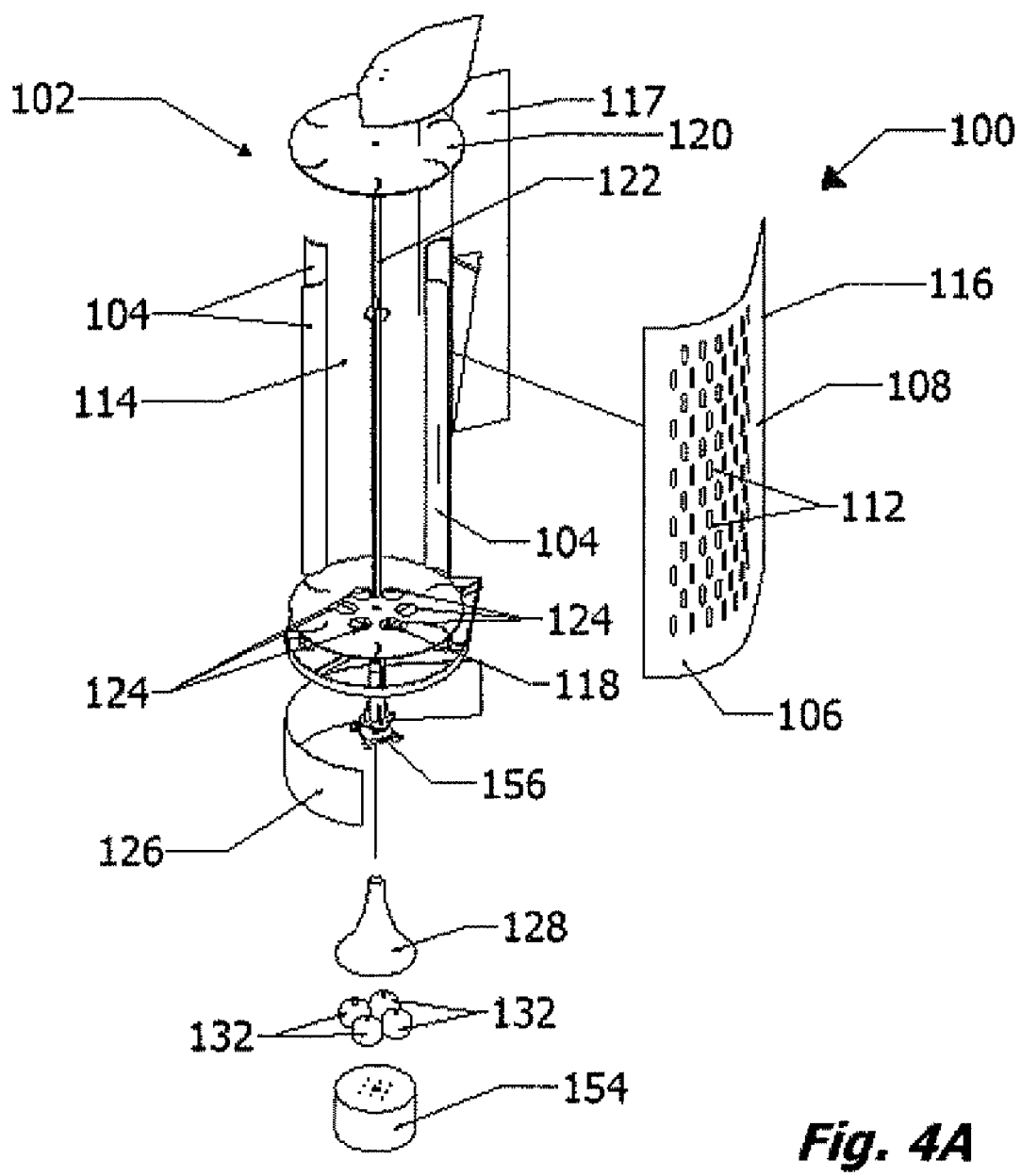
Figure 4B:
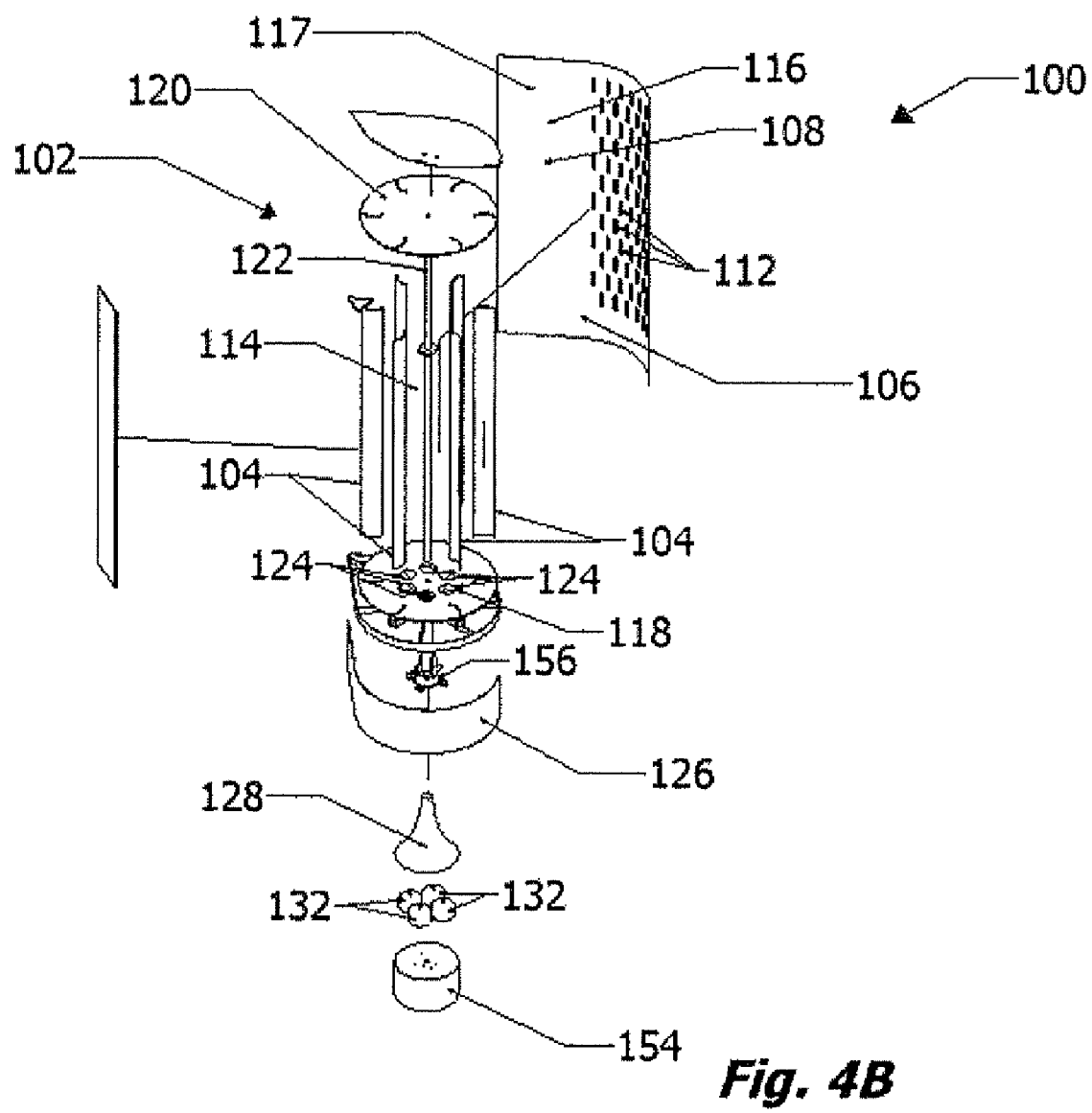
Figure 4C:
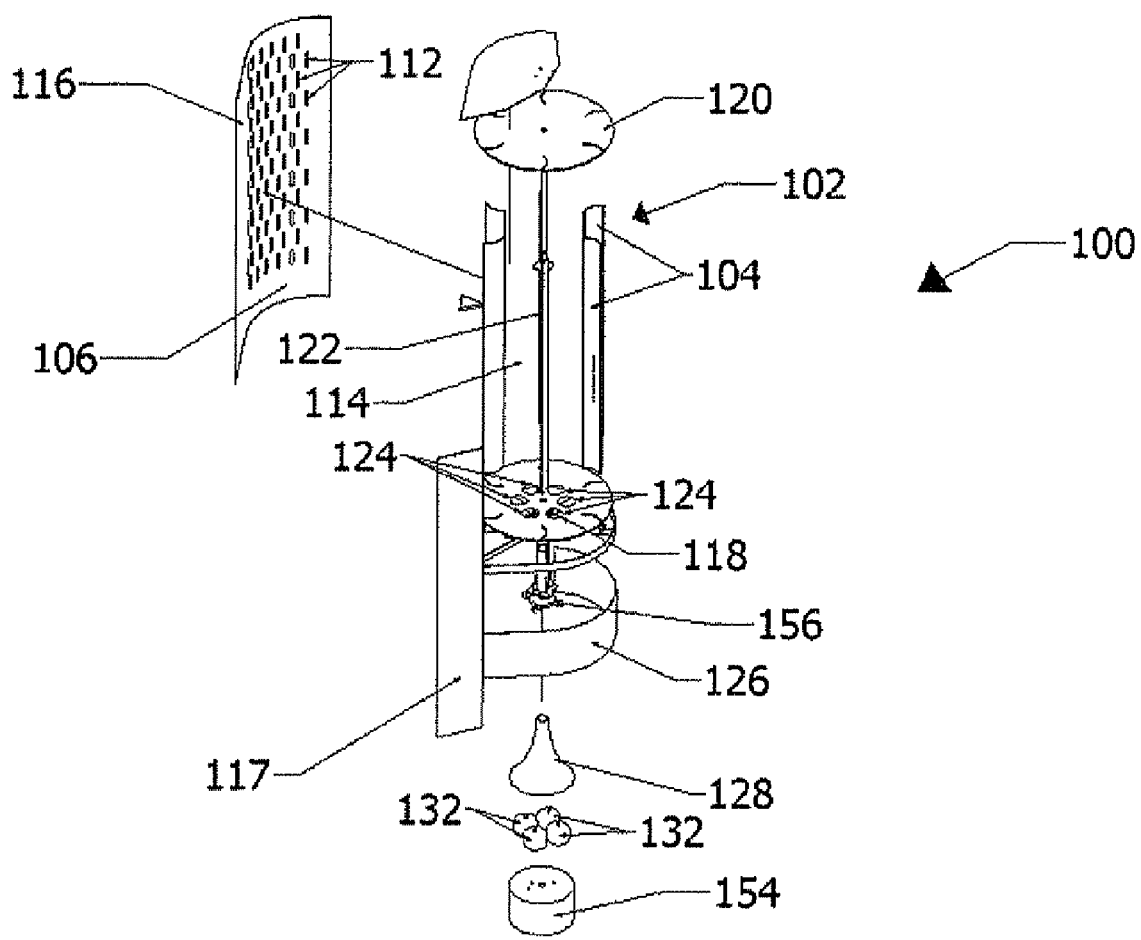
Figure 4D:
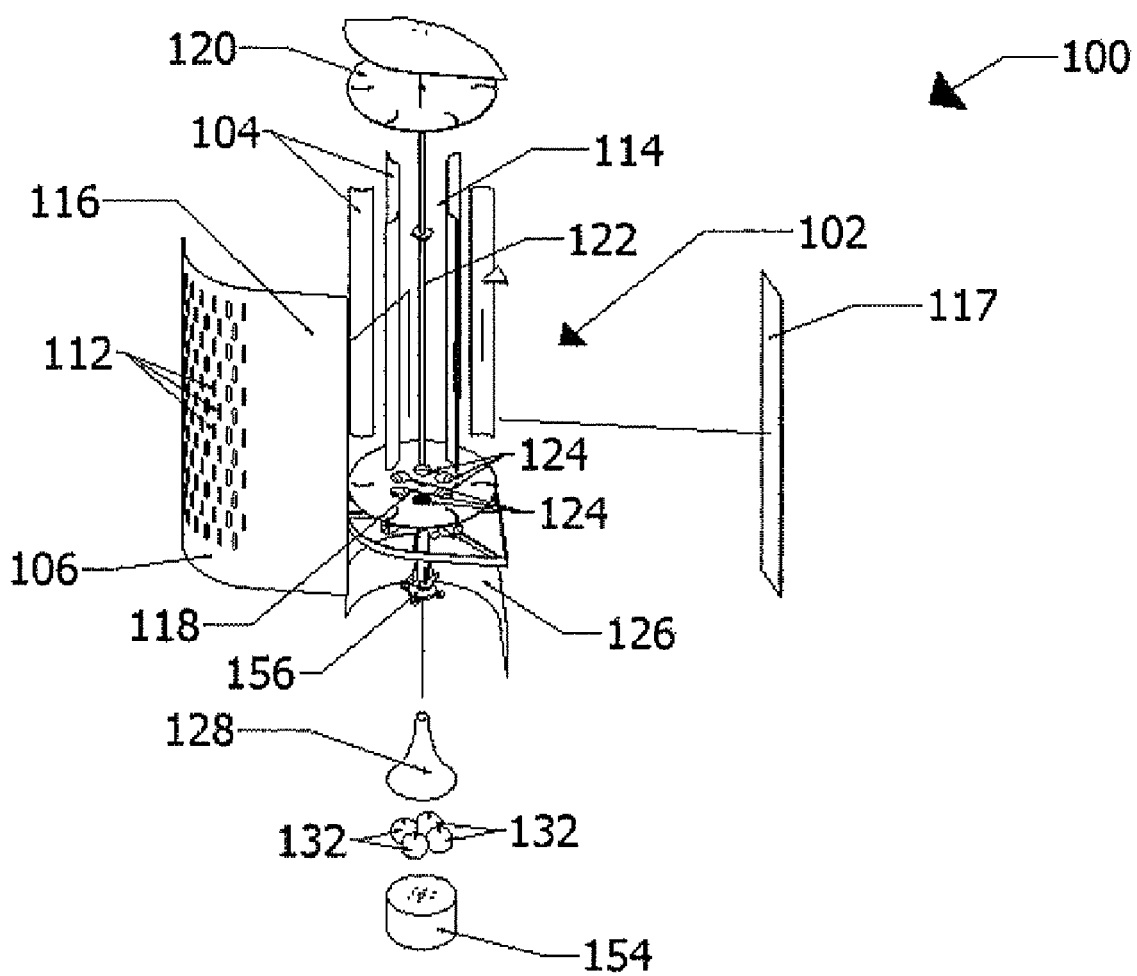

As shown in FIG. 3, the leading edge portion 108 of the shroud 106 is oriented in the direction of the fluid flow. In this particular embodiment, the fluid flow is wind. In other embodiments, a different fluid, e.g., water, etc., may be utilized by a fluid turbine device. The wind flow relative to the fluid turbine device 100 is shown in dotted lines with arrowheads. Wind flow is divided by the leading edge portion 108 of the fluid turbine device 100. Wind flow is deflected by the leading edge portion 108 around an external surface of the shroud 106 on the left side of the shown in FIG. 3, but external to the vertical blade assembly 102. In this exemplary manner, wind flow is deflected from entering a return path of the fluid turbine device 100 on the side. On a right side of the fluid turbine device, as shown in FIG. 3, wind flow is permitted to enter a drive path of the vertical blade assembly 102, thereby rotating the vertical blade assembly 102 relative to the shroud 106.

By limiting the fluid flow into the return path of the vertical blade assembly 102, the fluid turbine device 100 may operate with reduced fluid resistance to provide efficient operation of the vertical blade assembly 102. Additionally, or alternatively, the laminar flow about the leading edge portion 108 of the shroud 106 deflects wind flow about the fluid turbine device 100, effectively reducing direct wind flow contact (perpendicular to a surface) with fluid turbine device 100 (except for the blades 104 in the drive path). By limiting the direct wind flow contact, wind flow force on the overall fluid turbine device 100 and its support structure is also reduced, while providing efficient use of applied loads for generation of power.

As shown in FIG. 3, the leading edge portion 108 includes a surface 116 for deflecting a portion of a fluid flow in one direction to inhibit entry into the return path and a surface 118 at an angle relative to the surface 116, for deflecting a portion of the fluid flow in a different direction towards a drive path of at least a portion of the vertical blade assembly 102. The surface 116 is angled relative to the surface 118, at about 61 degrees. Other shapes, sizes and configuration (e.g., angles greater or less than 61 degrees, etc.) of surfaces including a leading edge portion may be employed in other embodiments of a fluid turbine device. In some embodiments, a surface for deflecting fluid towards a drive path may be omitted.

It should also be appreciated that different shapes and/or sizes of fluid turbine devices may be employed in other embodiments. Specifically, the ratio of the diameter (of the vertical blade assembly 102) to the height of the fluid turbine device 100 is about 1:2. A ratio of height to radius, the radius, and/or the height may be different, potentially based on one or more characteristics of an intended installation site or an environment (such as typical wind speed, densities of wind impediments (buildings, trees, etc.), required rotational/electrical output, manufacturing/fabrication, etc. Further, a different number, size, and/or configuration of blades may be included in other vertical blade assembly embodiments to affect fluid flow in a drive path, a return path, and/or fluid exhaust from a fluid turbine device. Additionally, although the fluid turbine device 100 defines an axis perpendicular to ground in the embodiment shown in FIGS. 1 and 2, it should be further appreciated that a fluid turbine device may be disposed such that the axis of the fluid turbine device is at a different angle relative to ground, e.g., parallel, non-perpendicular, etc.

As shown in the exploded views of FIGS. 4A-D, the vertical blade assembly 102 includes end plates 118, 120 disposed on opposite ends of the multiple blades 104. The multiple blades 104 are evenly distributed about the central axis 122 of the vertical blade assembly 102, and substantially at the edge of the end plates 118, 120. Each of the six blades 104 is disposed such that the end points of the blade are collinear to the central axis 122 of the vertical blade assembly 102. In other embodiments, a different number, size, type, configuration, and/or placement of blades may be employed in a vertical blades assembly.

As shown in FIGS. 4A-D, the end plate 118 includes multiple openings 124 to permit fluid flow from within the compartment 114 defined by the vertical blade assembly 102. When in use, the vertical blade assembly 102 rotates as a function of the wind flow entering the drive path of the vertical blade assembly 102. Rotation of the vertical blade assembly 102 may contribute to the formation of a wind vortex within the vertical blade assembly 102. The wind vortex permits exhaustion of wind flow through one or more of the multiple openings 124 in the end plate 118. A different number, shape, and/or size of openings may be defined by different fluid turbine device embodiments. In at least one embodiment, a bottom end plate may be omitted.

The shroud 106 includes a shroud skirt 126. The shroud skirt 126 extends slightly above the end plate 118 to assist in formation of the wind vortex within the vertical blade assembly 102. In this particular embodiment, the shroud skirt 126 provides generally consistent laminar flow below the vertical blade assembly 102 to prevent disturbances in the laminar flow about the fluid turbine device 100 at the vertical blade assembly 102. A different configuration of a shroud skirt may be included in different shroud embodiments and employed otherwise relative to the vertical blade assembly to reduce turbulence and/or assist laminar flow.

Also shown in FIG. 1, the fluid turbine device 100 includes a cowling 128 coaxially disposed relative to the vertical blade assembly 102. The cowling 128 provides a path of low resistance for the wind vortex to be received through the openings 124 defined in the end plate 118. When the wind vortex exits the vertical blade assembly 102, the cowling 128 guides the wind vortex out and away from the fluid turbine device 100, thereby providing an exhaust path for the wind vortex. In this manner, interaction between the exhausted wind vortex and the fluid flow relative to the drive path of the vertical blade assemble 102 may be limited, thereby providing efficient operation of the fluid turbine device 100. As the wind vortex is exhausted through the multiple openings 124 defined in the end plate 118 and deflected by the cowling 128, additional wind flow enters the drive path of the vertical blade assembly 102, with reduced turbulence, to further rotate the vertical blade assembly 102.

With reference to FIGS. 1, 2, and 3, the fluid turbine device 100 is configured such that the vertical blade assembly 102 rotates counter-clockwise (FIG. 3). Alternatively, as shown in FIG. 5, a fluid turbine device 200 includes a vertical blade assembly 202 configured to rotate clockwise about a central axis 222. Further, a cowling is omitted from the fluid turbine device 200. In this manner, a fluid vortex may be formed within the fluid turbine device 200 and sufficiently exhausted from the fluid turbine device 200 such that guiding the fluid vortex by a cowling may not be necessary for a desired operation of the fluid turbine device.

According to another embodiment of the present disclosure, FIG. 6 illustrates a fluid turbine device 300 may include a vertical blade assembly 302 having an end plate 318. The end plate 318 is disposed adjacent to multiple chambers 330. Each of the chambers 330 includes a fluid, such as anti-freeze, etc., sealed therein. Each of the chambers 330 are angled such that an end proximate to a central axis 322 of the vertical blade assembly 302 is lower than an end of the chamber distal from the central axis 322. In this manner, the fluid sealed within the chambers 330 rests substantially at the proximate end—close to the central axis 322—when the vertical blade assembly 302 is not rotating. Alternatively, when the vertical blade assembly 302 is rotating, the fluid sealed within the chambers 330 moves toward the perimeter of the end plate 318. In this manner, the vertical blade assembly 302 gains inertia to resist changes in rotation due to minor and/or transient changes in fluid flow relative to the fluid turbine device 300. On the contrary, when the fluid rests at the proximate end of the chambers 330 (the center axis 322 of vertical blade assembly 302), the vertical blade assembly 302 is more susceptible to changes in rotating, thereby providing easier initial rotation of the vertical blade assembly 302 from stop.

It should be appreciated that a different type of mass may be included at one or more locations in a fluid turbine device to affect the inertia of the vertical blade assembly when rotating. Further, the masses may be distributed differently—evenly or otherwise—to affect the inertia of a vertical blade assembly. In at least one embodiment, one or more chambers may comprise an end plate of a vertical blade assembly. Additionally, or alternatively, one or more chambers may be included at one or more different locations along a central axis of a vertical blade assembly, or elsewhere in a fluid turbine device, in some embodiments. In one example, chambers may be disposed at a top and/or a middle of a vertical blade assembly.

Referring again to FIGS. 4A-D, the fluid turbine device 100 includes multiple generators 132 enclosed by a generator enclosure 154 and mechanically coupled to the vertical blade assembly 102. The multiple generators 132 are provided to generate power when the vertical blade assembly 102 is rotated. While the fluid turbine device 100 includes four generators 132, a different number of generators may be included in different fluid turbine device embodiments. Generators may include any device suitable to convert mechanical energy into electrical energy.

In this particular embodiment, the generators 132 are alternators, which may need an electric field applied thereto—energized—prior to generating power. In this manner, each of the generators 132 may be selectively operated. In the particular embodiment shown, the generators 132 are selectively operated based on a rotational speed of the vertical blade assembly 102. As the speed of the vertical blade assembly 102 increases, the number of generators 132 energized also increases. In this manner, one or more of the multiple generators 132 may be operated close to peak output conditions, while the generators that are un-energized are not contributing to power generation or substantially inhibiting rotation of the vertical blade assembly—efficiency of the energize generators. Further, in various embodiments, rotational speeds coupled to each of multiple generators may be adjusted from one generator to another generator (e.g., via a planetary gear assembly, clutching device, electronic load device, etc.) to match an appropriate rotational speed with one or more characteristics of a particular generator. An exemplary planetary gear assembly 156 is shown in FIGS. 4A-D.

Additionally, or alternatively, in some applications, multiple generators may permit a fluid turbine device to generate at least some power, even if one of the multiple generators is not functional, e.g., damaged, etc. Accordingly, a fluid turbine device having less an all of the generators damaged may thus be partially functional even while waiting for the damaged generators to be repaired.

As shown in FIG. 7, a fluid turbine device 400 according to another embodiment of the present disclosure includes a shroud 406 and a steering assembly 434 coupled to the shroud 406. The steering assembly 434 is configured to orient the leading edge portion 408 of the shroud 406 in-line with a direction of fluid flow. The steering mechanism 434 includes a rudder connected to the shroud 406. In the particular embodiment of FIG. 7, the steering assembly 434 is sufficiently compact to fit within the footprint of the vertical blade assembly 402 and shroud 406. In other embodiments, different shapes, sizes, and configurations of rudders, for example, beyond a footprint of a vertical blade assembly and/or shroud, may be employed to orient a shroud relative to a direction of fluid flow.

In the embodiment of FIGS. 8A-B, a fluid turbine assembly 500 includes a steering assembly. The steering assembly includes a fluid flow detector 536 and a motor 538 operably coupled to the fluid flow detector 536. As shown in FIG. 8A, the fluid flow detector 536 is disposed at the leading edge portion of the shroud 506. As shown in FIG. 8B, the motor 538 is disposed adjacent to a frame member 542 of the shroud 506 to orient the shroud 506 in-line with a direction of fluid flow, as detected by the fluid flow detector 536. In this particular embodiment, the motor 538 includes a servo motor. Other suitable types of motors, such as stepper motors, etc., and fluid flow detectors may be employed in other embodiments in one or more different positions on or near a shroud or fluid turbine device to orient the shroud in a direction of fluid flow. In some embodiments, a steering mechanism may be configured to orient a leading edge portion of a shroud relative to the direction of the fluid flow to be out-of-line with the direction of fluid flow to compensate for an over-speed condition, such as inclement weather, etc. Orienting of the shroud in this manner may restrict the rotational speed of a vertical blade assembly to an acceptable operating range such that the fluid turbine device is able to operate during the over-speed condition and continue to generate power, rather than shutting down.

According to another exemplary embodiment of the present disclosure, a shroud 606 for a fluid turbine device is shown in FIG. 9. The shroud 606 includes an apertured surface 640 and a leading edge portion 608. The shroud's leading edge portion 608 has a surface 616 for deflecting fluid from a return path of multiple blades of a vertical blade assembly and a surface 617 for deflecting fluid flow into a drive path of the multiple blades. The surfaces 616, 617 are angled relative to one another (e.g., at an angle of about 60 degrees, etc.). The shroud 606 also includes a shroud skirt 626 and a frame member 642 for supporting the shroud skirt 626 and/or receiving a central axis of a vertical blade assembly. In the particular embodiment, the frame member 642 includes spoke segments 644 having reduced surface area in the direction of an axis to be received by the frame member 642 to limit interference with fluid flow relative to a vertical blade assembly.

As shown, the apertured surface 640 includes multiple staggered rows of openings 612. In other embodiments, such as shown in FIG. 2, a shroud may include elongate openings. It should be appreciated that a different pattern (e.g., stagger or un-staggered, etc.) size, shape, and/or number of openings may be included in different shroud embodiments. In at least some embodiments, a pattern of openings defined by an apertured surface may be dependent on a desired fluid flow between the two sides of the apertured surface or an expected pressure differential generator on the two sides of the apertured surface. Additionally, or alternatively, other factors, such as environmental characteristics, etc., may be considered.

One or more fluid turbine devices as disclosed herein may be included in an electrical system in some embodiments. In one example embodiment, shown in FIG. 10, an electrical system may include a grid 746 and multiple fluid turbine devices 700 electrically coupled to the grid 746. The multiple fluid turbine devices 700 provide power to the grid 746, which may be electrically connected to power one or more electrical devices. The grid 746 may be a grid private to the multiple turbine devices 700 or a public utility grid. In at last one embodiment, multiple fluid turbine devices are coupled to a private grid that is coupled to a public utility grid at a junction. A gateway device disposed at the junction opens/closes electrical continuity based on potential power generated by the fluid turbine devices. In another embodiment, as shown in FIG. 11, an electrical system may include an energy storage device (e.g., one or more batteries, capacitors, etc.) 848 and a fluid turbine device 800 electrically coupled to the battery 848. The battery 848 may be employed to store un-used power generated by the fluid turbine device 800. In still other embodiments, an electrical system may be a different combination of grids (public or private), storage devices, and fluid turbine devices.

According to another embodiment, a wind turbine device is illustrated in FIG. 12. The wind turbine device 900 is coupled to a support structure 952 of a billboard assembly 950. The billboard assembly 950 may include lights and/or one or more displays (not shown), which may be powered by the wind turbine device 900. The billboard assembly 950 may be coupled to a grid so that power generated by the wind turbine device 900 (but not used by the lights and/or displays) may be supplied to other electrical devices and/or batteries coupled to the grid. The billboard assembly 950 may or may not include one or more batteries. It should be appreciated that a wind turbine device may be coupled to one or more other components of a billboard assembly, as long as the fluid turbine device 900 is exposed (at least part of the time) to fluid flow. FIG. 12 illustrates but one example environment in which aspects of the present disclosure may be used. Alternative uses and environments are also possible for an embodiment of a fluid turbine device disclosed herein, including uses and environments in which the blades are caused to rotate by either a flow of gas (e.g., air, etc.) or liquid (e.g., water, etc.)

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A fluid turbine device comprising:
   a vertical blade assembly having multiple blades; and
   a shroud rotatable relative to the vertical blade assembly, the shroud including:
      a leading edge portion for deflecting a first portion of a fluid flow from entering a return path of at least a portion of the vertical blade assembly; and
      a portion defining multiple openings configured to permit fluid from within a compartment defined by the vertical blade assembly to exhaust out of the return path;
   wherein the vertical blade assembly includes first and second end plates disposed on opposite ends of the multiple blades; and
   wherein at least one of the end plates includes at least one mass moveable towards a perimeter of the second end plate when the vertical blade assembly is rotating.

2. The fluid turbine device of claim 1, wherein the shroud defines at least a portion of an airfoil shape.

3. The fluid turbine device of claim 2, wherein the at least a portion of the airfoil shape is configured to generate low pressure adjacent to the multiple openings to enable exhaust of fluid from within the compartment defined by the vertical blade assembly.

4. The fluid turbine device of claim 1, wherein the leading edge portion includes:
   a first surface for deflecting a first portion of a fluid flow in a first direction to inhibit entry into the return path; and
   a second surface at an angle relative to the first surface, for deflecting a second portion of the fluid flow in a second direction towards a drive path of at least a portion of the vertical blade assembly.

5. The fluid turbine device of claim 1, wherein the second end plate includes multiple openings to permit fluid flow from within the compartment defined by the vertical blade assembly.

6. The fluid turbine device of claim 1, wherein the at least one mass includes a fluid sealed within a chamber defined by the second end plate.

7. The fluid turbine device of claim 1, wherein the shroud includes a shroud skirt extending above the second end plate to assist in formation of a vortex of fluid within the vertical blade assembly.

8. The fluid turbine device of claim 7, further comprising a cowling coaxially disposed relative to the vertical blade assembly, the cowling configured for providing an exhaust path for the fluid vortex.

9. The fluid turbine device of claim 1, further comprising at least one generator mechanically coupled to the vertical blade assembly for generating power when the vertical blade assembly is rotated.

10. The fluid turbine device of claim 9, wherein the at least one generator includes multiple generators selectively operable based on a rotational speed of the vertical blade assembly.

11. The fluid turbine device of claim 1, further comprising a steering assembly for orienting the leading edge portion of the shroud relative a direction of fluid flow.

12. A shroud for a fluid turbine device having multiple blades rotatable in response to a fluid flow, the shroud comprising an apertured surface and a leading edge portion having a first surface for deflecting fluid from a return path of the multiple blades and a second surface angled relative to the first surface for deflecting fluid flow into a drive path of the multiple blades; wherein the apertured surface includes multiple staggered rows of elongate openings.

13. The shroud of claim 12, wherein the leading edge portion and the apertured surface define at least a portion of an airfoil shape configured to generate a low pressure adjacent to the apertured surface, when the shroud is coupled to a blade assembly with the leading edge portion oriented into the fluid flow.

14. A fluid turbine device comprising a blade assembly and the shroud of claim 12.

15. A fluid turbine device comprising:
   a vertical blade assembly having first and second end plates and multiple blades disposed about a central axis between the two end plates; and
   a shroud having a leading edge portion and an apertured surface including multiple staggered rows of elongate openings, the vertical blade assembly being disposed at least partially within the shroud and rotatable relative to the shroud, the leading edge portion being configured to deflect fluid flow around an external surface of the shroud on a first side external to the vertical blade assembly, while permitting fluid to enter a drive path of at least one of the multiple blades on a second side of the vertical blade assembly.

16. An electrical system comprising a grid and a fluid turbine device of claim 15 electrically coupled to the grid.

17. An electrical system comprising an energy storage device and at least one fluid turbine device of claim 15 electrically coupled to the battery.

* * * * *